(12) United States Patent
Sandberg (10) Patent No.: US 11,812,704 B2
(45) Date of Patent: Nov. 14, 2023

(54) SAP COLLECTOR

(71) Applicant: John W. Sandberg, Taylors Falls, MN (US)

(72) Inventor: John W. Sandberg, Taylors Falls, MN (US)

(73) Assignee: John W. Sandberg, Taylors Falls, MN (US)

(*) Notice: Subject to any disclaimer, the term of this patent is extended or adjusted under 35 U.S.C. 154(b) by 48 days.

(21) Appl. No.: 17/524,301

(22) Filed: Nov. 11, 2021

(65) Prior Publication Data

US 2022/0142063 A1 May 12, 2022

Related U.S. Application Data

(60) Provisional application No. 63/112,502, filed on Nov. 11, 2020.

(51) Int. Cl.
*A01G 23/14* (2006.01)

(52) U.S. Cl.
CPC .................... *A01G 23/14* (2013.01)

(58) Field of Classification Search
CPC .............................. A01G 23/14; A01G 23/10
USPC ..................... 47/50, 51, 52, 53, 54
See application file for complete search history.

(56) References Cited

U.S. PATENT DOCUMENTS

| | | | | |
|---|---|---|---|---|
| 323,704 A * | 8/1885 | Mattice | ............... | A01G 23/14 47/53 |
| 2,023,399 A * | 12/1935 | Bullard | ............... | A01G 23/14 220/774 |
| 5,050,759 A * | 9/1991 | Marble | ............... | A47G 19/2272 220/711 |
| 6,827,233 B1 * | 12/2004 | Scallate | ............... | B44D 3/125 220/736 |
| 7,959,030 B2 * | 6/2011 | Bergman | ............... | B44D 3/126 220/570 |
| 8,371,473 B2 * | 2/2013 | Scribner | ............... | A01K 7/027 47/65.5 |
| 11,117,419 B2 * | 9/2021 | Herbert | ............... | B44D 3/123 |
| 2009/0040865 A1 * | 2/2009 | Benjamin, II | ............... | B01F 35/421 366/209 |
| 2009/0183397 A1 * | 7/2009 | Kubo | ............... | E02F 3/60 37/399 |

OTHER PUBLICATIONS

An example prior art sap sack; Date Reviewed: May 11, 2020 [online] [site visited Nov. 11, 2022] https://images-na.ssl-images-amazon.com/images/I/81PMfVqhZiL._AC_SX300_QL70_ML2_.jpg.

(Continued)

*Primary Examiner* — Brady W Frazier
*Assistant Examiner* — Zoe Tam Tran
(74) *Attorney, Agent, or Firm* — Merchant & Gould P.C.

(57) ABSTRACT

A sap collecting device includes a top end, a bottom end, and a sidewall extending between the top and bottom ends. The sidewall defines a generally tapering cross-sectional profile as the sidewall extends from the bottom end toward the top end. At least a portion of the bottom end is open, and the sidewall defines a notch along a location between the top portion and the bottom portion to provide a handle for holding the sap collecting device. A taphole is located on the sidewall that is configured to engage a tap. The taphole is positioned generally below the notch defined by the sidewall and is communication with the open portion of the bottom end.

15 Claims, 12 Drawing Sheets

(56) References Cited

OTHER PUBLICATIONS

An example prior art sap sack holder; Date First Available: Jun. 3, 2015 [online] [site visited Nov. 11, 2022] (Year: 2015) https://www.bing.com/images/search?view=detailV2&ccid=wUhlkg1h&id=A9DA0911CBB066D259815C1A0B511B2EE4A969EB&thid=OIP.wUhlkg1hGo5Q0uGnxH0elgHaGn&mediaurl=http%3a%21%2frrpwhite.com%2fimages%2fMlimages%21MTstep3.jpg&exph=1426&expw=1595&q=sap+sack+holders&simid=608002880236619278&selectedIndex=50&ajaxhist=0.

An example prior art sap sack holder; Date First Available: Jun. 2, 2015 [online] [site visited Nov. 11, 2022] (Year: 2015) https://www.bing.com/images/search?view=detailV2&ccid=xABwiJ%2br&id=652D01A2013C355812135104A2C29D7448AB2FAE2&thid=OIP.xABwiJ-rJZfranIs3gBpCAHaFP&mediaurl=http%3a%2M2frmwhite.com%2fimages%2fIMTimages%2fHolderSapMeister.jpg&exph=1159&expw=1639&q=sap+sack+holders&simid=608055815642874030&selectedIndex=3&ajaxhist=0.

* cited by examiner

SAP COLLECTOR

CROSS-REFERENCE TO RELATED APPLICATION

This application claims the benefit of U.S. Provisional Application Ser. No. 63/112,502, filed Nov. 11, 2020, the disclosure of which is hereby incorporated by reference in its entirety.

TECHNICAL FIELD

The present disclosure relates generally to devices for collecting sap or other fluids from trees.

BACKGROUND

Typically, sap (and other fluids) are collected from trees with a multi-part device including a tap and a bucket. A tap is inserted within the tree and a bucket collects the sap (or other fluid). The sap (or other fluid) needs to be emptied periodically before the bucket overflows. Buckets can pose other problems, for example, open buckets can introduce impurities into the sap.

There exists a need for improved sap collecting devices.

SUMMARY

The following summary is made by way of example and not by way of limitation. It is merely provided to aid the reader in understanding some of the aspects of the inventive features.

In one embodiment, a sap collecting device includes a top end, a bottom end, and a sidewall extending between the top and bottom ends. The sidewall defines a generally tapering cross-sectional profile as the sidewall extends from the bottom end toward the top end. At least a portion of the bottom end is open, and the sidewall defines a notch along a location between the top portion and the bottom portion to provide a handle for holding the sap collecting device. A taphole is located on the sidewall that is configured to engage a tap. The taphole is positioned generally below the notch defined by the sidewall and is communication with the open portion of the bottom end.

In another embodiment, a sap collecting kit includes a sap collecting device and a sap collecting bag. The sap collecting device includes a top end, a bottom end, and a sidewall extending between the top and bottom ends. The sidewall defines a generally tapering cross-sectional profile as the sidewall extends from the bottom end toward the top end. At least a portion of the bottom end is open, and the sidewall defines a notch along a location between the top portion and the bottom portion to provide a handle for holding the sap collecting device. A taphole is located on the sidewall that is configured to engage a tap. The taphole is positioned generally below the notch defined by the sidewall and is communication with the open portion of the bottom end. The sap collecting bag is removably connectable to the bottom end of the sap collecting device.

BRIEF DESCRIPTION OF THE DRAWINGS

The inventive aspects of the present disclosure can be more easily understood, and further advantages and uses thereof can be more readily apparent, when considered in view of the detailed description and the following figures in which.

In accordance with common practice, the various described features may not be drawn to scale but are drawn to emphasize specific inventive features relevant to the present disclosure. Reference characters denote like elements throughout the figures and the text.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
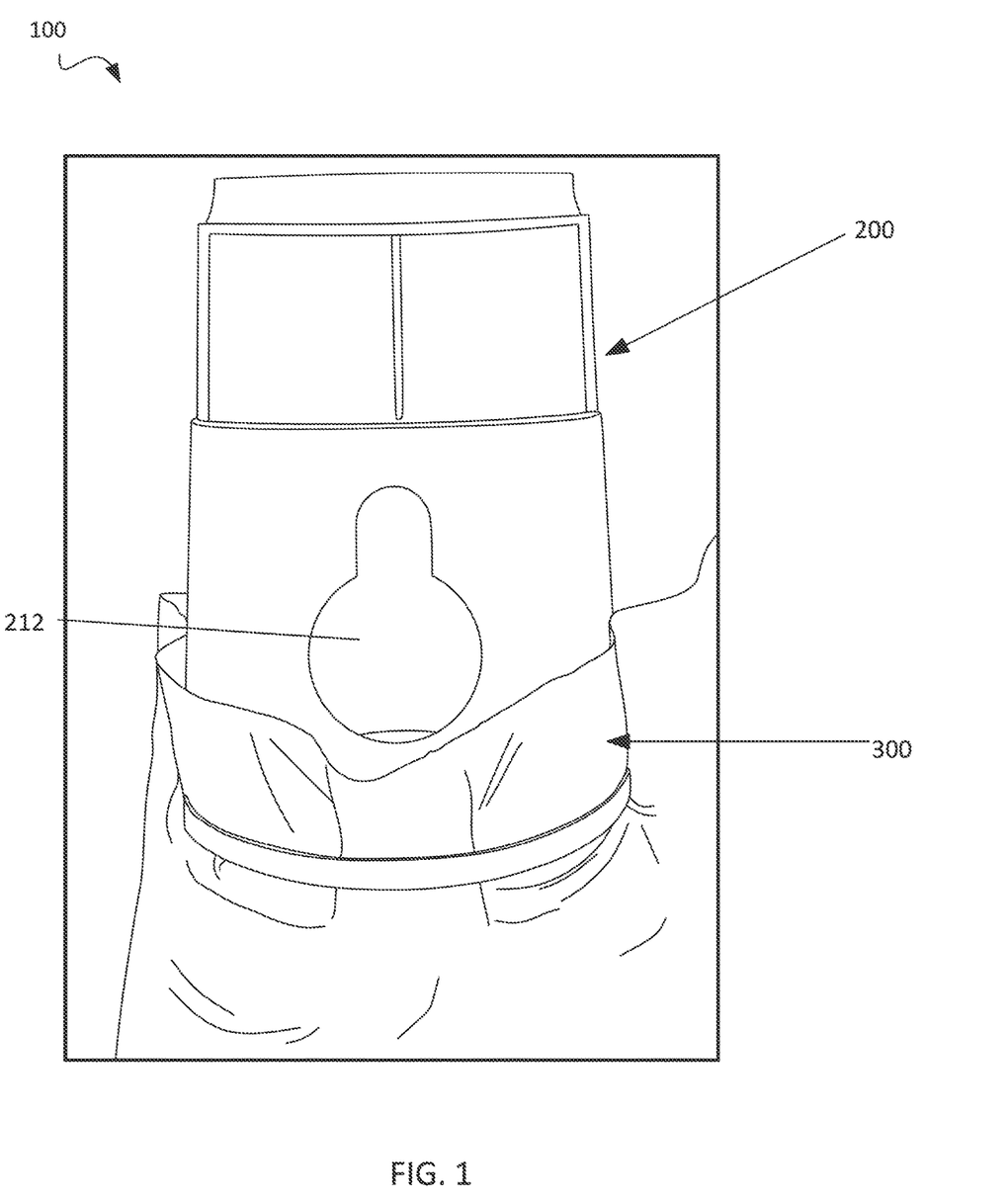
FIG. 1 illustrates an example embodiment of a collector cup and attached bag.

FIG. 1 illustrates an example sap collector device 100 including a collector cup 200 and attached collection bag 300. In an embodiment, the collector cup 200 is made from a hard plastic material, such as polypropylene; however, other materials are possible. In the depicted embodiment, the collector cup 200 is opaque, which helps protect against UV exposure.

The collection bag 300 is removably attached to the collector cup 200 and extends from a bottom end of the collector cup 200. To retrieve sap that has been collected in the collection bag 300, the collector cup 200 can be pivoted around the tap by a user, allowing sap to flow out from the collection bag 300 into another collection vessel.

In an alternative embodiment, the collection bag 300 can be removed from the collector cup 200, while the collector cup 200 is still attached to a tap on a tree A. A new or replacement collection bag 300 can be attached to the collector cup 200, if needed.

Figure 2:
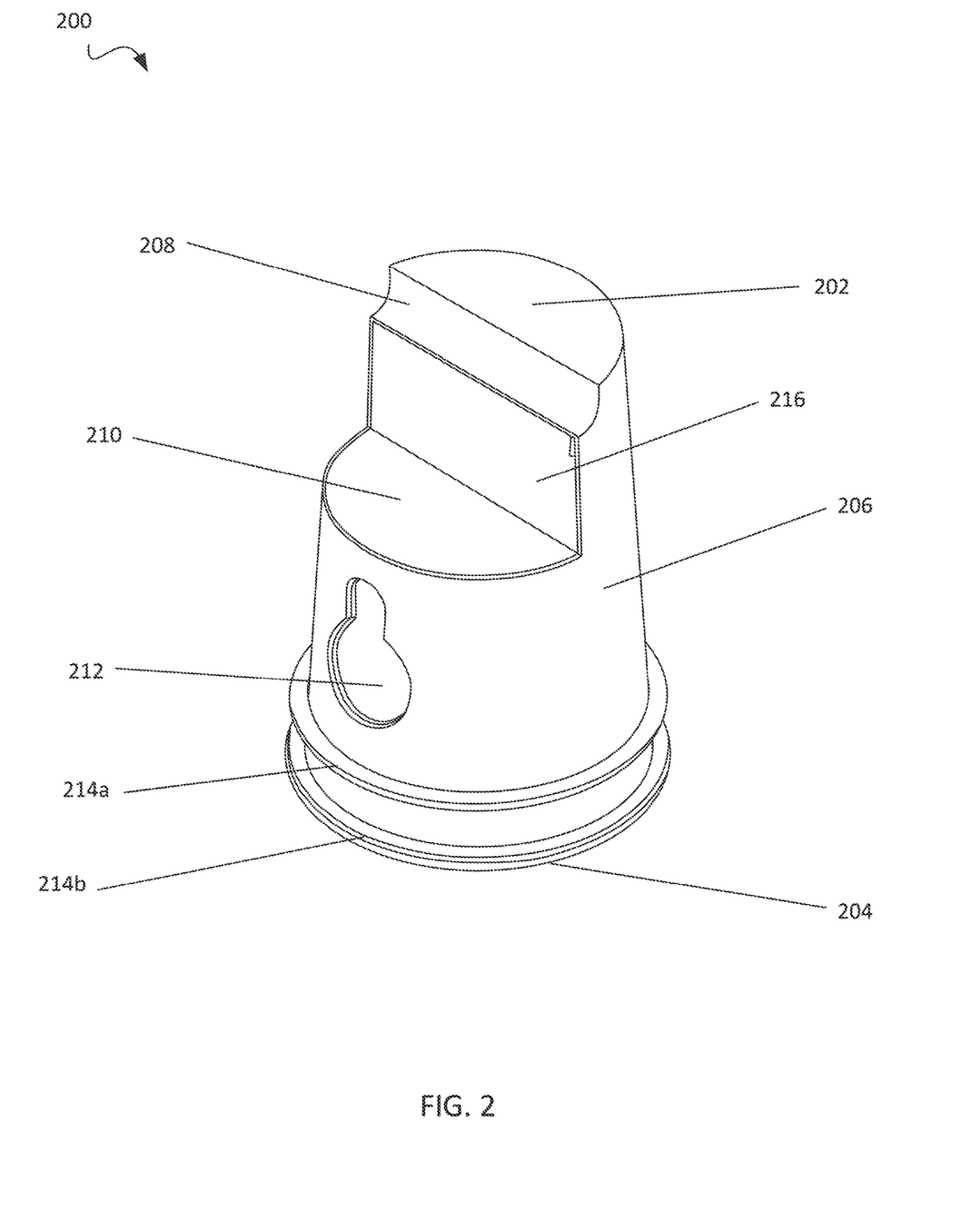
FIG. 2 illustrates a perspective view of an example embodiment of the collector cup.

FIG. 2 illustrates a perspective view of the collector cup 200. In the depicted embodiment, the collector cup 200 has a generally cylindrical shape with a top end 202, a bottom end 204, and a sidewall 206 extending therebetween. In other embodiments, the collector cup 200 may be oval, rectangular, or triangular in shape. In the embodiment shown, the top end 202 has a semi-circle shape and is generally flat. However, other shapes, including a circle, a rectangle, and other similar shapes or portions thereof may define the top end 202. The top end 202 may be generally flat.

In an embodiment, the top end 202 includes a depression 208. The depression 208 extends from a first side of the sidewall 206 to an opposing side of the sidewall 206 at the top end 202. The depression 208 is concave in shape and generally useful for fingertips to grip the collector cup 200. When the top end 202 defines a semi-circular shape, the depression 208 is located along the straight side of the semi-circle. However, the depression 208 may be located along a side of the top end 202 when the top end 202 is shaped differently.

The collector cup 200 also includes a notch 210. The notch 210 is located on the sidewall 206 at a location between the top end 202 and the bottom end 204. The notch 210 is provided for defining a handle for holding the collector cup 200.

In the embodiment shown, the notch 210 is located between the top end 202 and the bottom end 204. A wall 216 extends from the top end 202 to an intermediate top end that defines the notch 210. The notch 210 is located at approximately half the total height of the collector cup 200. The notch 210 defines an intermediate end of the collector cup 200 that has a generally flat top surface. An intermediate end defined by the notch 210 may have a sloped or tapered profile. Still further, the intermediate end defined by the notch 210 need not be a semi-circle, but other shapes as desired.

In an embodiment, a bottom end 204 of the collector cup 200 is circular in shape. However, the bottom end 204 may be shaped differently as desired, such as having a rectangular, triangular, oval, or other shapes or portions thereof. The bottom end 204 defines at least a partial opening so the interior of the collector cup 200 is accessible. In the embodiment depicted, the bottom end 204 is entirely open to the interior of the collector cup 200.

A sidewall 206 connects the top end 202 with the bottom end 204. The sidewall 206 defines a generally tapering cross-sectional profile as the sidewall 206 extends from the bottom end 204 to the top end 202. The sidewall 206 may taper at an angle of from approximately 0° to approximately 15°, or from approximately 0° to approximately 10°, or from approximately 0° to approximately 5°. For example, the top end 202 has a diameter (or cross-sectional length) that is less than a diameter (or cross-sectional length) of the bottom end 204. In the embodiment shown, the sidewall 206 is cylindrical in shape. However, the sidewall 206 may define other shapes.

The sidewall 206 also includes a taphole 212. The taphole 212 includes a tap receiving portion 404 and a tap retention portion 402. The tap receiving portion 404 has a size that is greater than a size of the tap retention portion 402. In an example, the tap receiving portion 404 has a diameter that is greater than a diameter of the tap retention portion 402. In alternative embodiment, the taphole 212 need not be circular in shape. The tap retention portion 402 of the taphole 212 is sized to rest on a tap located on a tree A.

In an embodiment, where the sidewall 206 includes a notch 210, the taphole 212 is located on a same side of the sidewall 206 and is located adjacent the location of the notch 210.

The sidewall 206 may also include at least one bag attachment feature 214. The bag attachment feature 214 may define a flange extending at least partially along the sidewall 206. In another embodiment bag attachment feature 214 extends along the entire sidewall 206. In a further embodiment, the sidewall 206 includes a bag attachment feature 214a and a second bag attachment feature 214b adjacent the bottom end 204, where a fastener 304 is captured there between.

Figure 3:
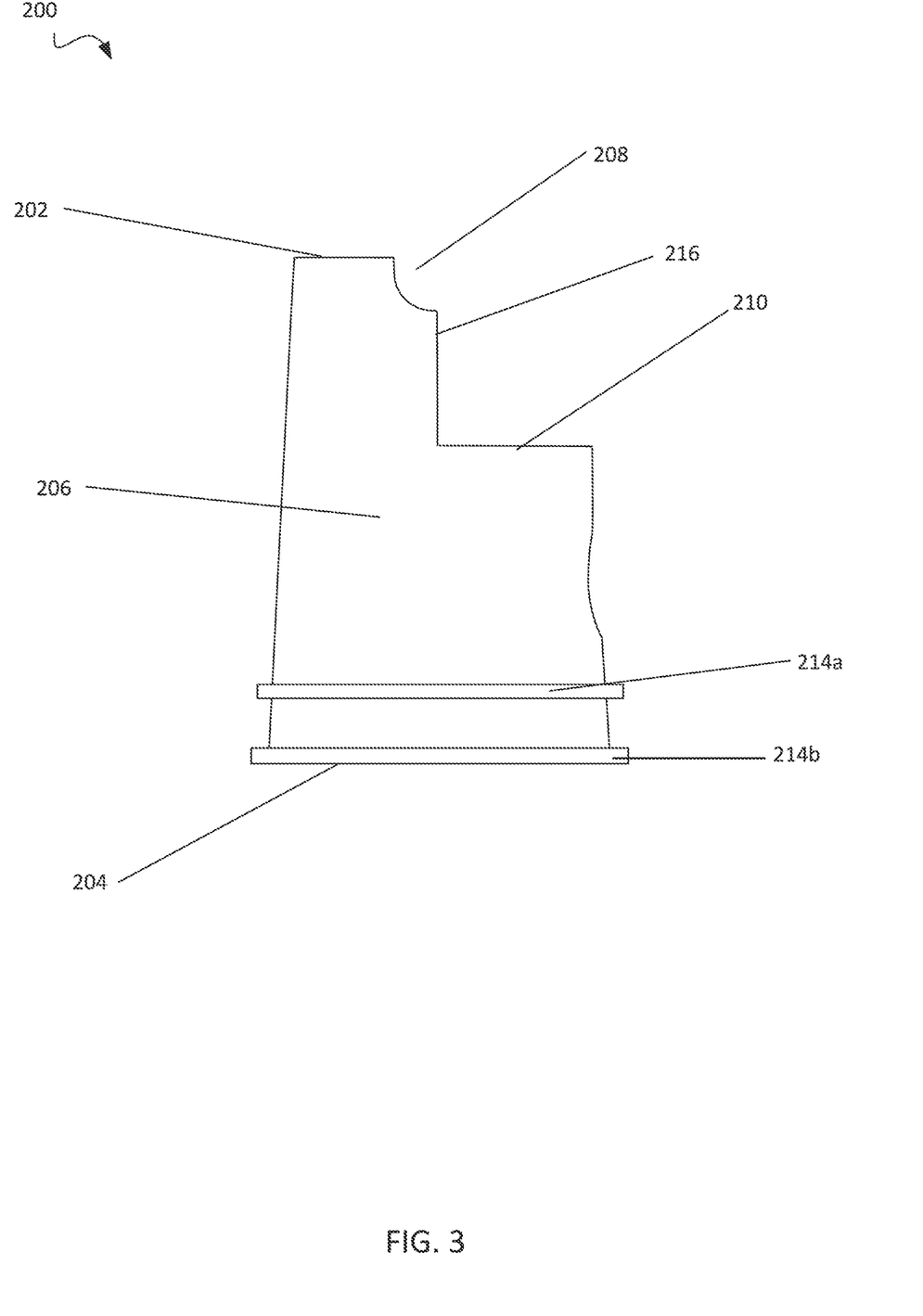
FIG. 3 illustrates a side view of the collector cup of FIG. 2.

FIG. 3 illustrates a side view of an exemplary embodiment of the collector cup 200, wherein the side profile defines an L-shape. In the embodiment shown, the top end 202 is generally flat and extends approximately halfway across the entire diameter of the collector cup 200. The depression 208 is located on an interior side of the top end 202.

The sidewall 206 extends cylindrically along the top end 202 and the notch 210 down to the bottom end 204. The sidewall 206 also includes the wall 216 that connects the top end 202 to the notch 210.

The first bag attachment feature 214a and the second bag attachment feature 214b extend around the entire sidewall 206 adjacent to the bottom end 204.

A diameter of the top end 202 is less in diameter than a diameter of the bottom end 204. The collector cup 200 tapers in shape, where the bottom end 204 is larger than the top end 202. A tapered collector cup 200 allows for stacking a plurality of collector cups 200 for storage and/or transport.

In an example embodiment, the collector cup 200 is from about 3 inches to about 8 inches tall, measuring from the bottom end 204 to the top end 202. For example, the collector cup 200 may be from about 4 inches to about 5 inches tall. The collector cup 200 may have a diameter of the bottom end 204 of from about 2 inches to about 5 inches, or from about 3 inches to about 4 inches. The top end 202 and the notch 210 combine to have a diameter of from about 1 inch to about 2 inches.

Figure 4:
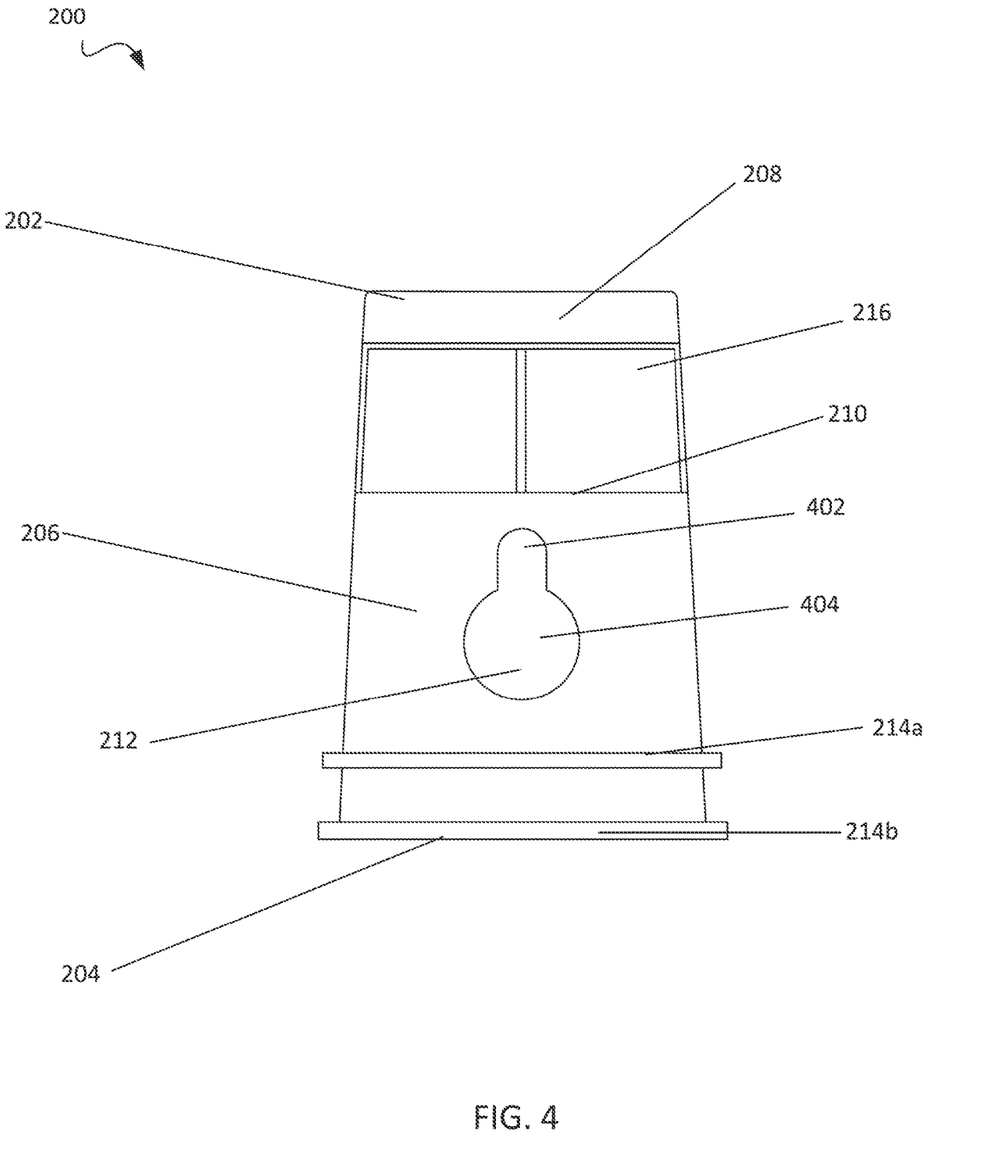
FIG. 4 illustrates another side view of the collector cup of FIG. 2.

FIG. 4 illustrates an alternative side view of the collector cup 200. As shown, the notch 210 is located on the same side as the depression 208. The taphole 212 is also located on the same side as the notch 210 and the depression 208.

The taphole 212 is shaped having a smaller top portion, the tap retention portion 402, and a larger bottom portion, the tap receiving portion 404. In an embodiment, the tap receiving portion 404 is circular and has a diameter that is greater than a diameter of the tap retention portion 402, which is also circular. The tap retention portion 402 of the taphole 212 may have a first diameter of about 0.5 inches, and a total height, including the tap receiving portion 404, of approximately 1.5 inches.

Figure 5:
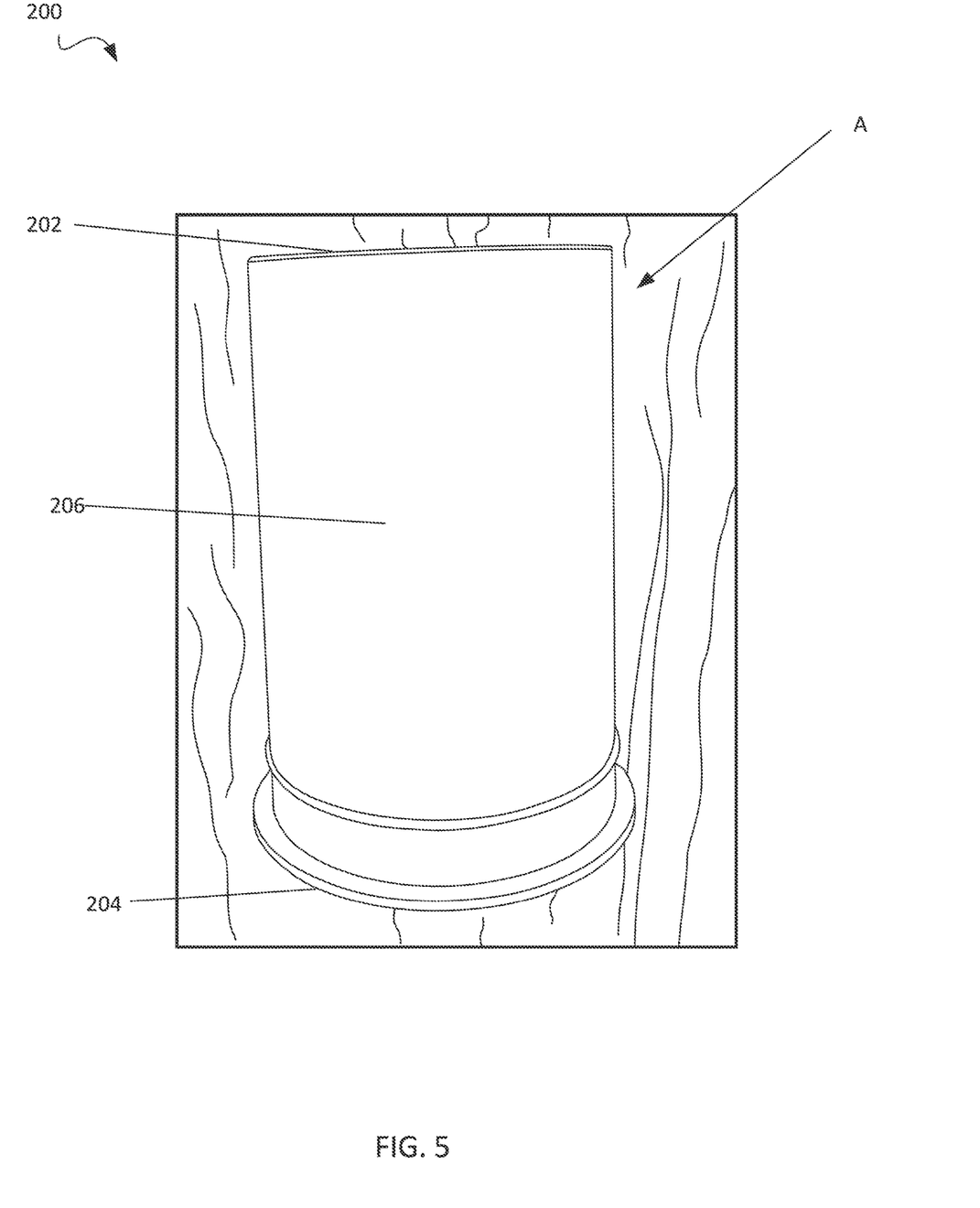
FIG. 5 illustrates an example embodiment of the collector cup attached to a tree.

FIG. 5 illustrates an example embodiment of the collector cup 200 attached to a tap (not shown) attached to a tree A. The orientation of the collector cup 200 while on a tap is such that the top end 202 is located above the bottom end 204.

Figure 6:
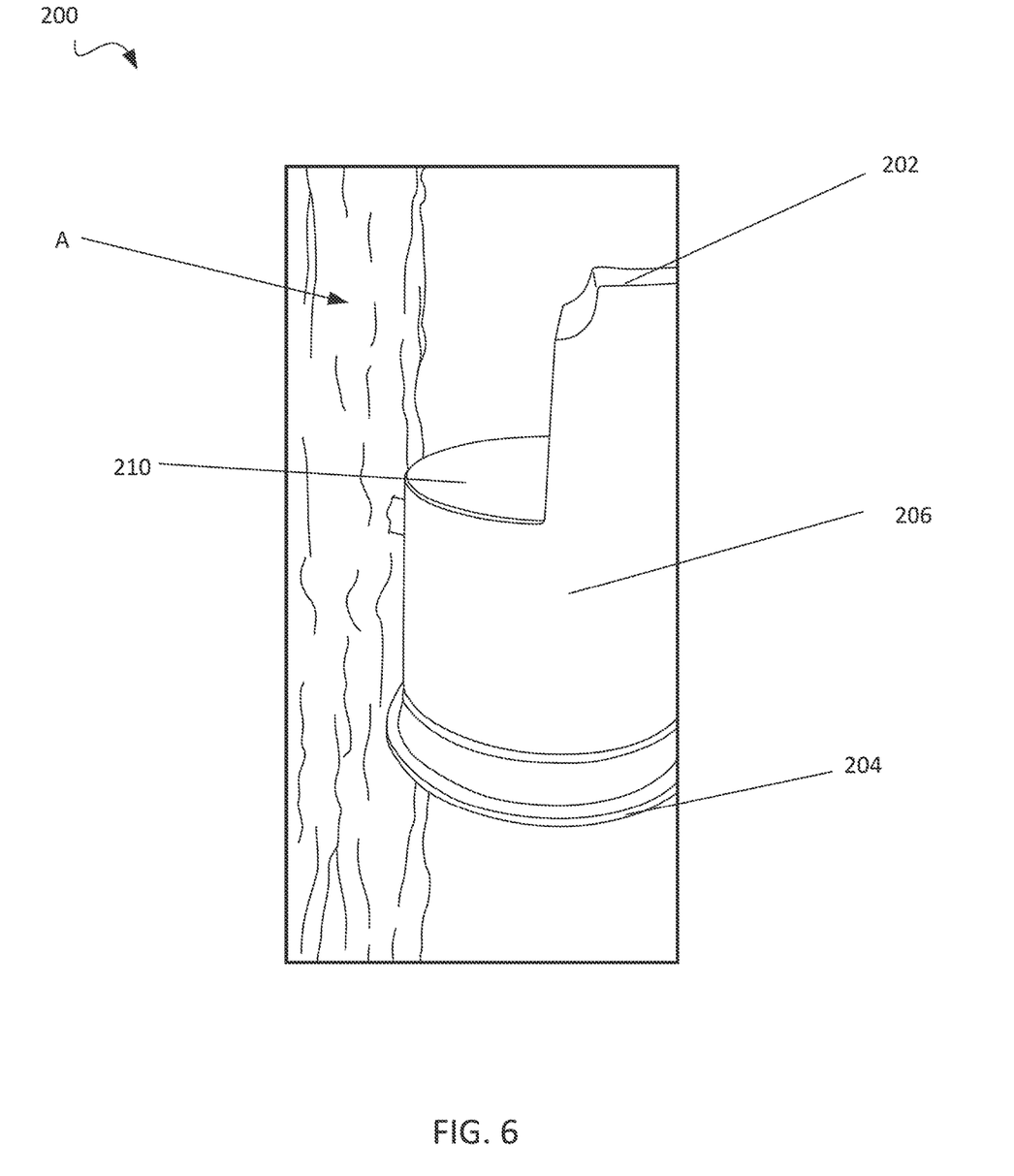
FIG. 6 illustrates another example embodiment of the collector cup attached to a tree.

FIG. 6 illustrates a side view of an example embodiment of the collector cup 200 on a tap (not shown) attached to a tree A. The embodiment shown includes the notch 210, which is located adjacent the tree A, and the top end 202 is located further away from the tree A. The depression 208 of the top end 202 faces the tree A.

Figure 7:
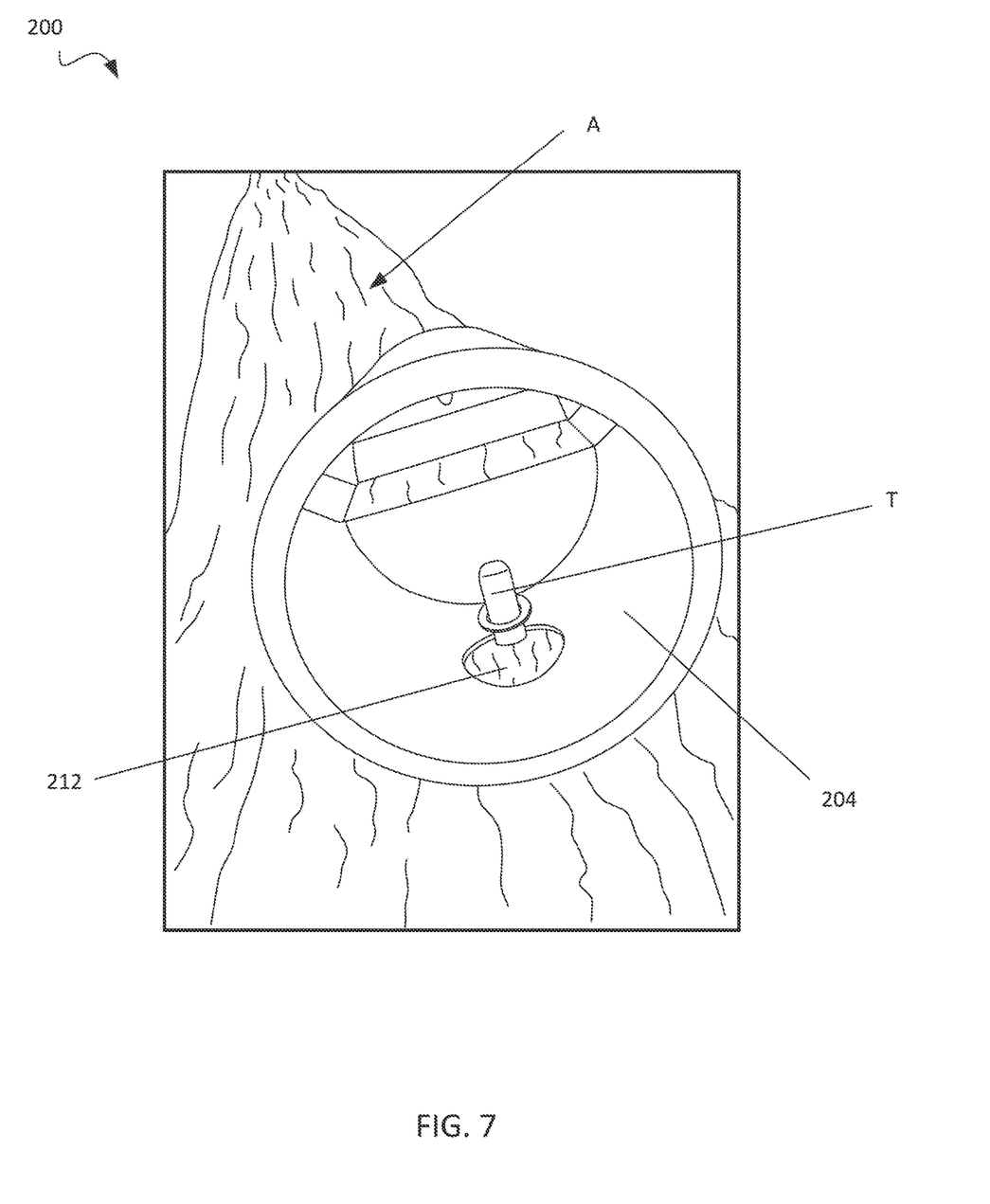
FIG. 7 illustrates an example embodiment of the bottom of the collector cup attached to a tree.

FIG. 7 illustrates a bottom up view of the collector cup 200 on a tap T attached to a tree A. As shown, the bottom end 204 of the collector cup 200 is completely open to the interior. However, in other embodiments, only a portion of the bottom end 204 may be open. Also shown is the taphole 212 being used to support the collector cup 200 on a tap T.

Although not shown, the collector cup 200 may include at least one stiff rib extending along the sidewall between the top end and the bottom end.

Figure 8:
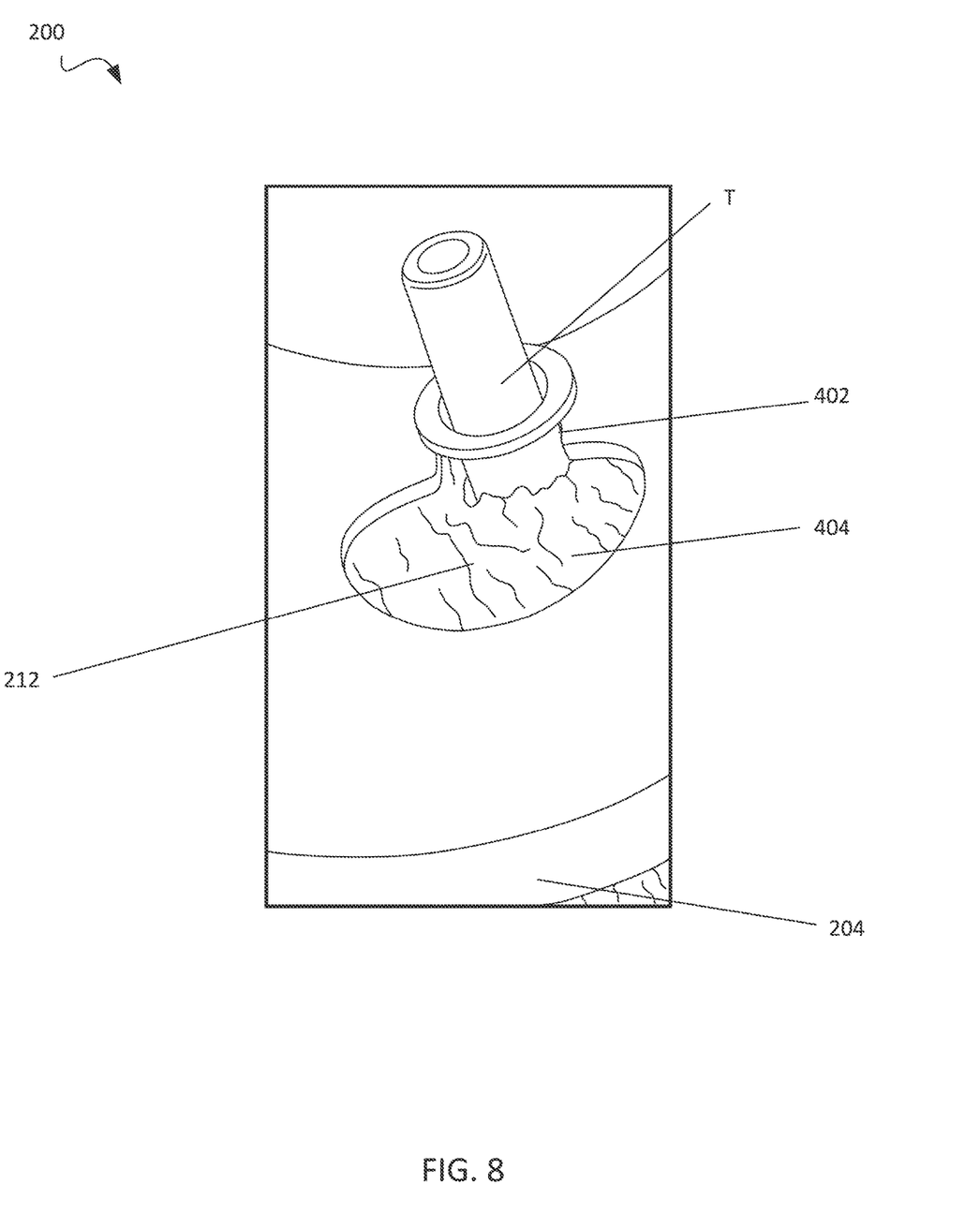
FIG. 8 illustrates another example embodiment of the bottom of the collector cup attached to a tree.

FIG. 8 illustrates a close-up view of the taphole 212 useful to support the collector cup 200 on a tap T. The tap receiving portion 404 of the taphole 212 is sized to allow the collector cup 200 to be placed over the tap T. The tap retention portion 402 of the taphole 212 is sized to allow the collector cup 200 to be supported by the tap T with little or no chance of falling off the tap T.

In use, sap flows from the tap T into an interior of the collector cup 200, and into a collection bag (shown in FIGS. 1 and 9) that is removably secured to the collector cup 200.

Figure 9:
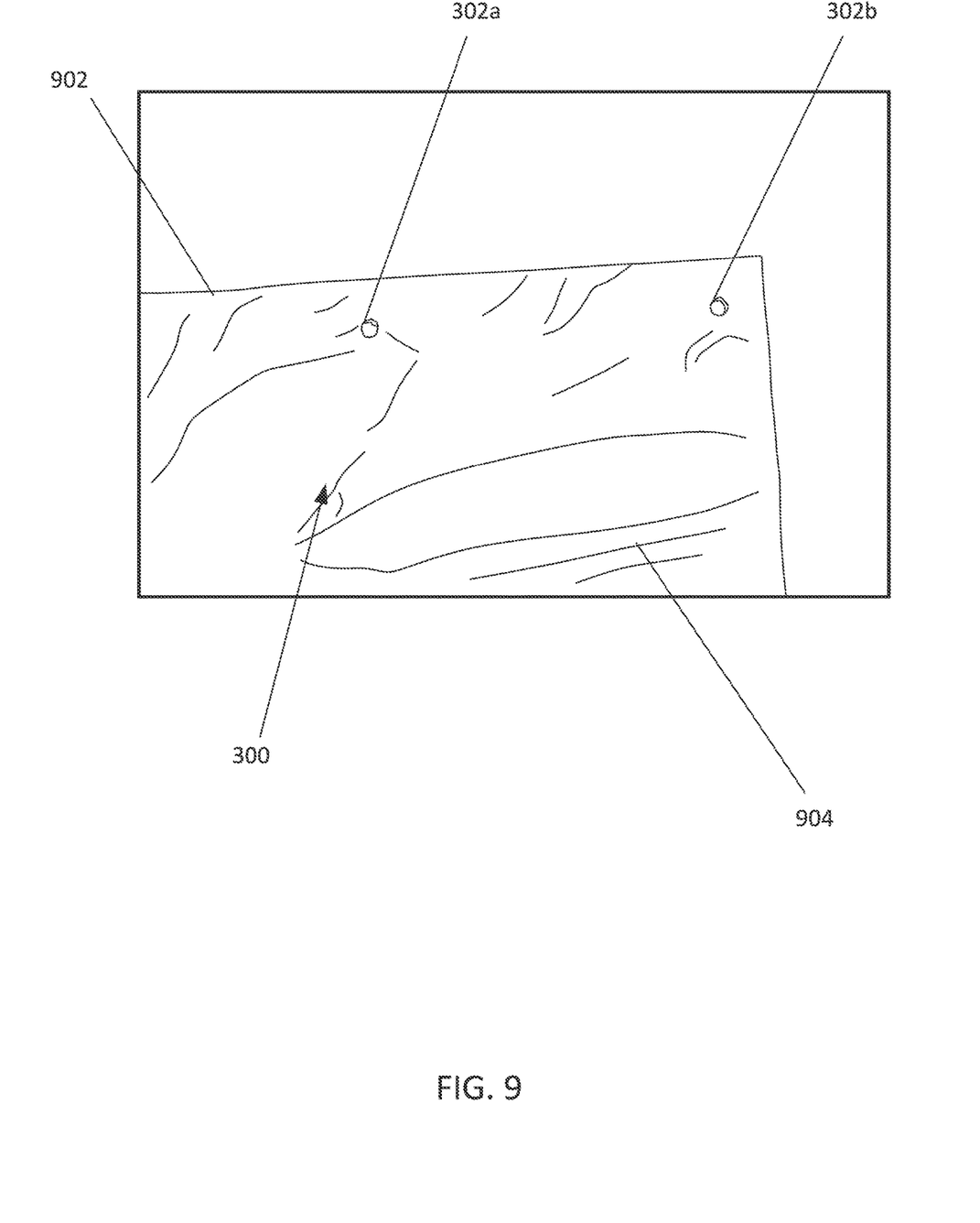
FIG. 9 illustrates an example embodiment of the bag.

FIG. 9 illustrates an example collection bag 300 in isolation. The collection bag 300 may be made from a plurality of materials, such as plastic, vinyl, or other similar materials. Further, the collection bag 300 is opaque, which prevents UV light from penetrating the contents of the collection bag 300.

The collection bag 300 includes a first attachment mechanism 302a (e.g., a set of openings) and a second attachment mechanism 302b (e.g., a set of openings). The collection bag 300 includes a top portion 902 that is partially open between the first attachment mechanism 302a and the second attachment mechanism 302b. The bottom portion 904 is sealed. The first attachment mechanism 302a is located adjacent to the top portion 902 approximately a midline of the collection bag 300. The second attachment mechanism 302b is located adjacent the top portion 902 and adjacent the side of the collection bag 300. A distance between the first attachment mechanism 302a and the second attachment mechanism 302b is about half the circumference of the bottom end 204 of the collector cup 200 to allow the collection bag 300 to fit about the bottom end 204 of the collector cup 200.

The first attachment mechanism 302a and the second attachment mechanism 302b have a size large enough to have a fastener fit there through. For example, a fastener might be a cable tie, such as a zip tie or other similar mechanism.

Figure 10:
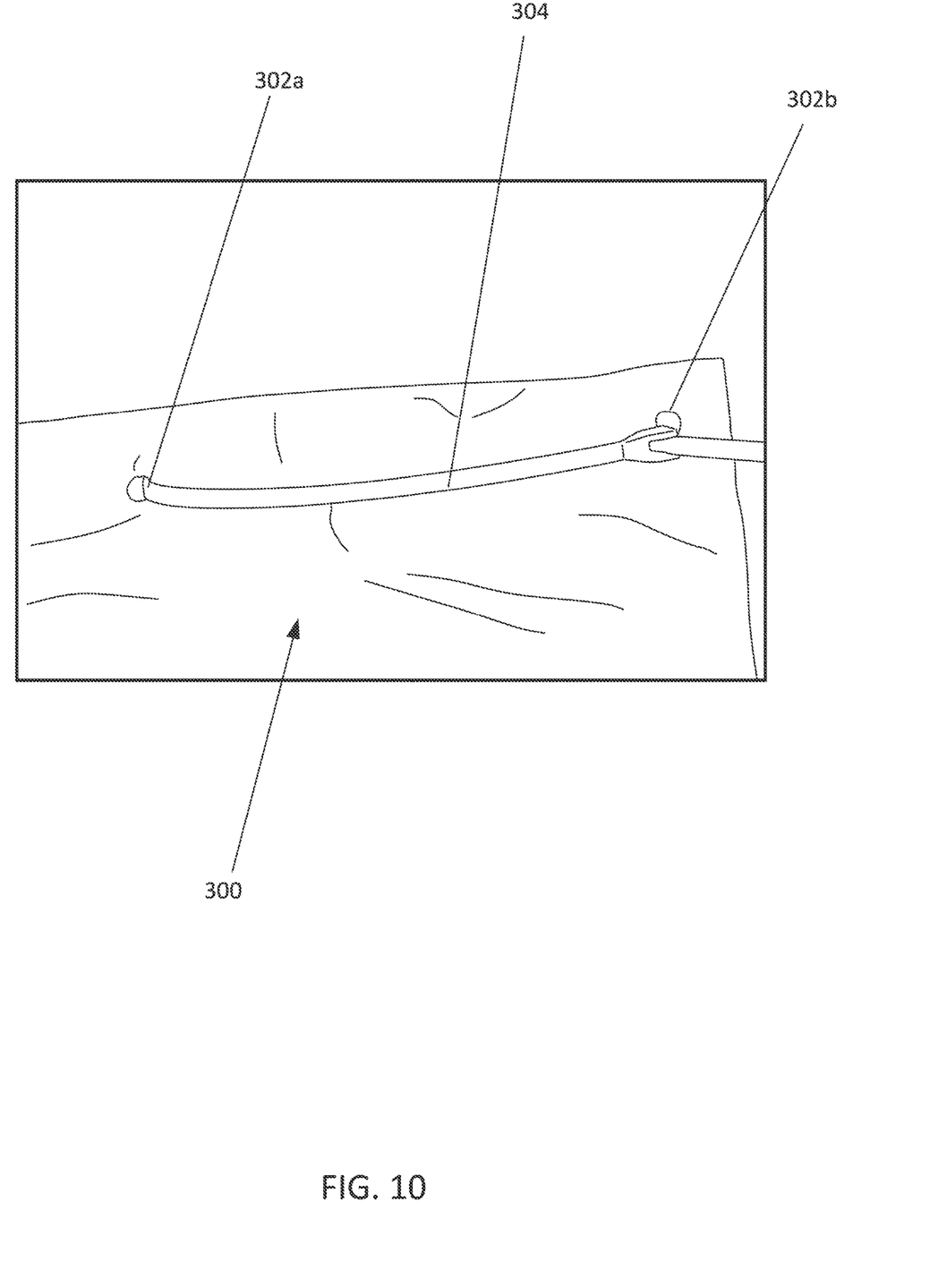
FIG. 10 illustrates an example embodiment of a bag and a fastener.

FIG. 10 illustrates an example collection bag 300 with a fastener 304 threaded through the first attachment mechanism 302a and the second attachment mechanism 302b.

Figure 11:
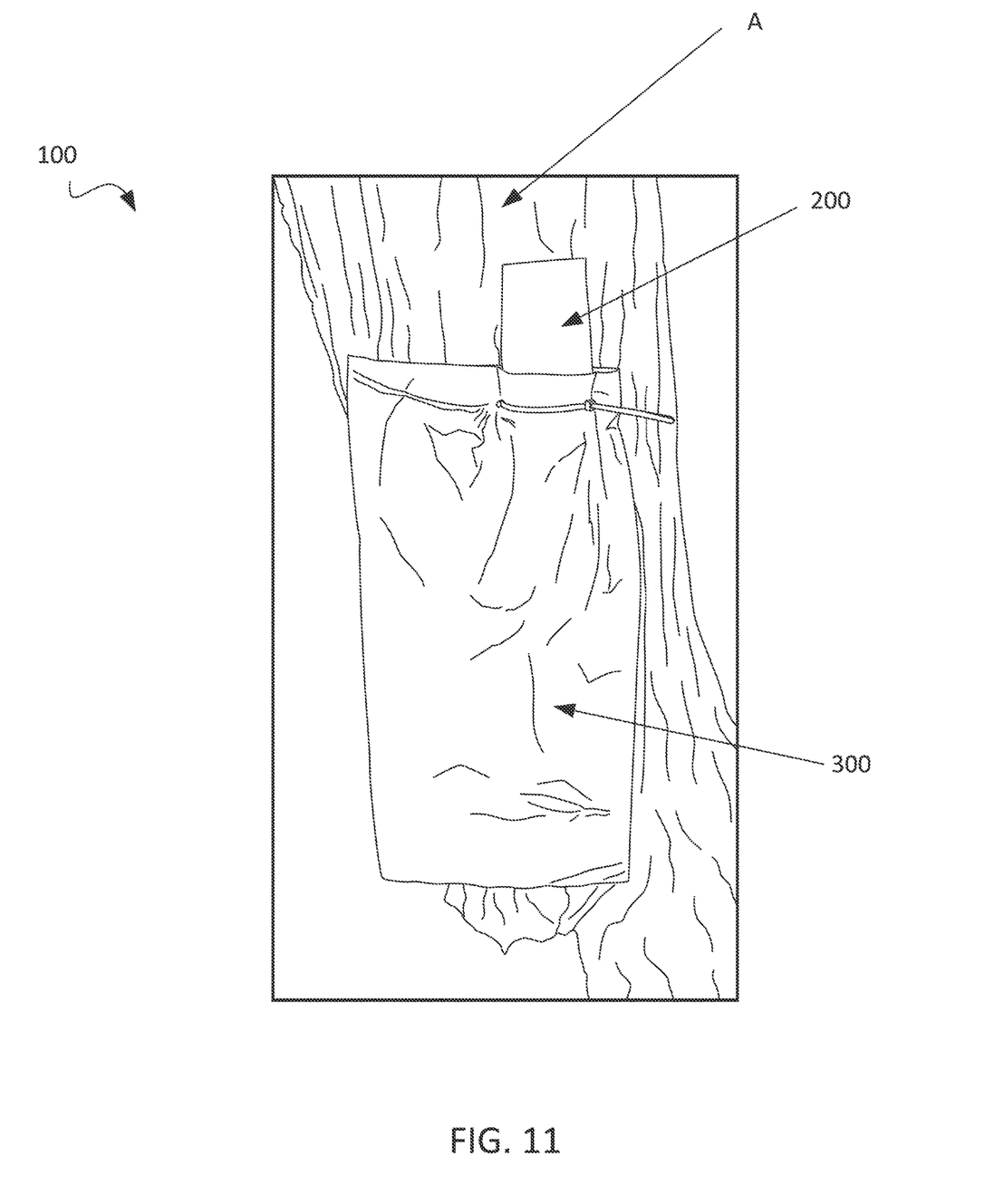
FIG. 11 illustrates an example embodiment of the collector cup and attached bag attached to a tree.

FIG. 11 illustrates an example collector cup 200 with attached collection bag 300 connected to a tree A. The collector cup 200 rests upon a tap (not shown). The collection bag 300 extends downward from the collector cup 200.

Figure 12:
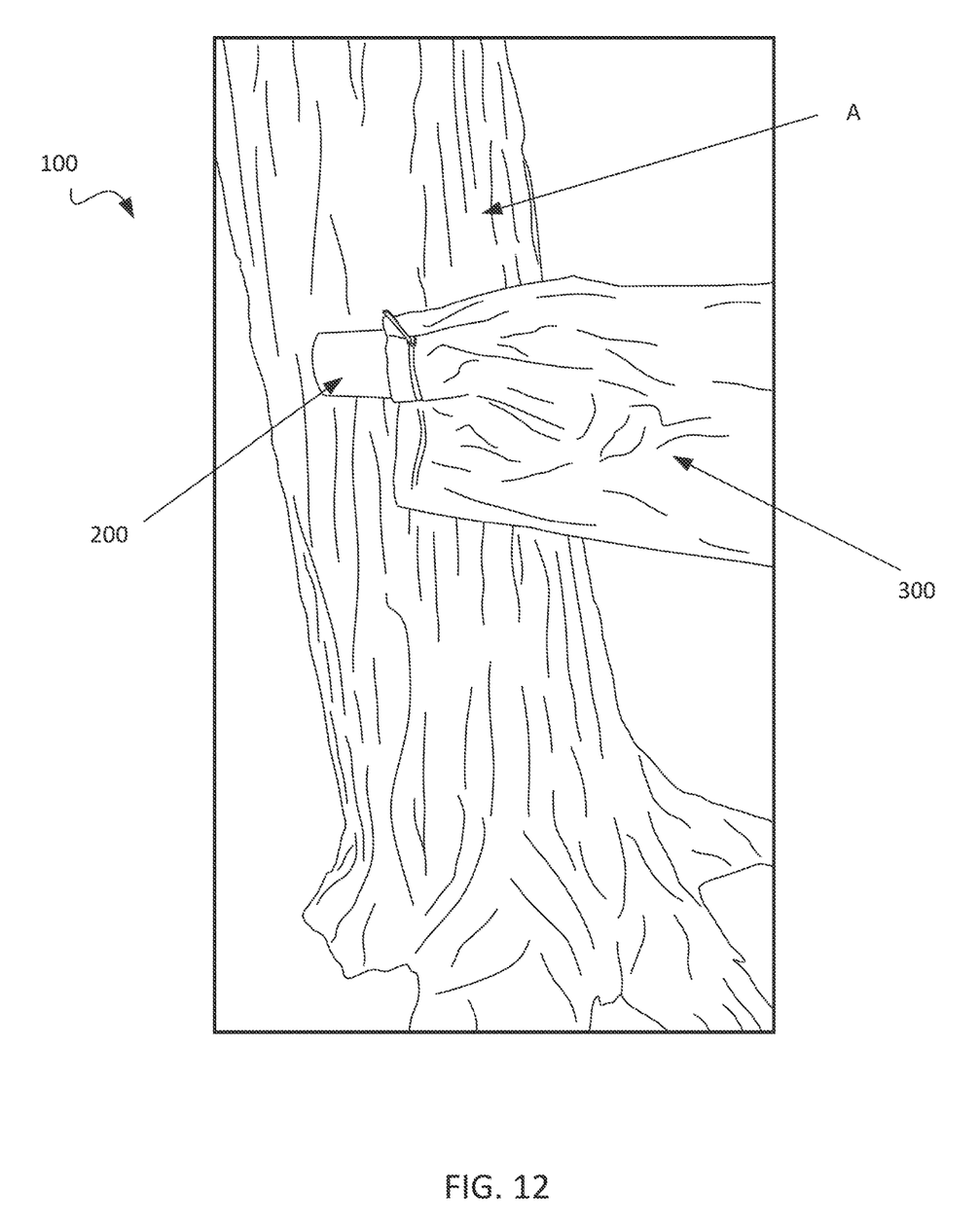
FIG. 12 illustrates an alternative example embodiment of the collector cup and attached bag attached and to a tree and pivoted about a spout.

FIG. 12 illustrates an orientation of the collector cup 200 and the collection bag 300 when it is pivoted around a tap T attached to a tree A. In the orientation shown in FIG. 12, a longitudinal axis of the collector cup 200 extends at an angle parallel to the ground from the tree A, as does the collection bag 300. This allows a user to empty the sap collected in the collection bag 300 into another collection vessel (not shown) without having to remove the collector cup 200 from the tree or remove the collection bag 300 from the collection cup 200.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A sap collecting device comprising:
  a top end, a bottom end, and a sidewall extending between the top and bottom ends;
  the sidewall defining a generally tapering cross-sectional profile as the sidewall extends from the bottom end toward the top end, at least a portion of the bottom end being open, the sidewall defining a notch along a location between the top end and the bottom end so as to provide a handle for holding the sap collecting device; and
  a taphole located on the sidewall that is configured to engage a tap, the taphole being positioned generally below the notch defined by the sidewall, the taphole in communication with the open portion of the bottom end;
  wherein the top end further defines a concave depression adjacent the notch, the concave depression configured to facilitate fingertip grip, wherein the notch defines an L-shaped configuration of the sap collecting device, wherein a first end of the L-shaped configuration terminates adjacent the concave depression of the sap collecting device and a second end of the L-shaped configuration terminates between the top end and bottom end to form an intermediate end.

2. The sap collecting device of claim 1, wherein the sidewall is generally curved.

3. The sap collecting device of claim 1, wherein the sidewall is generally cylindrical.

4. The sap collecting device of claim 1, wherein the taphole defines a tap receiving portion and a tap retention portion.

5. The sap collecting device of claim 4, wherein the tap retention portion has a smaller width than a width of the tap receiving portion.

6. The sap collecting device of claim 1, wherein the notch is on a same side of the sidewall as the taphole.

7. The sap collecting device of claim 1, wherein the sap collecting device includes at least one bag attachment feature adjacent the bottom end.

8. The sap collecting device of claim 7, wherein the bag attachment feature defines a flange extending at least partially along the sidewall.

9. The sap collecting device of claim 7, wherein the bag attachment feature defines two parallel bag attachment features providing a space therebetween for accommodating a bag fastener.

10. The sap collecting device of claim 1, wherein a cross-sectional profile of the sidewall defines a taper angle of between 1° and 10°.

11. The sap collecting device of claim 1, wherein a cross-sectional profile of the sidewall tapers inwardly as it extends from the bottom end to the top end.

12. The sap collecting device of claim 1, wherein the top end is closed.

13. The sap collecting device of claim 1, further comprising a stiff rib extending along the sidewall between the top end and the bottom end.

14. A sap collecting kit comprising:
a sap collecting device comprising:
a top end, a bottom end, and a sidewall extending between the top and bottom ends;
at least a portion of the bottom end being open, the sidewall defining a notch along a location between the top end and the bottom end so as to provide a handle for holding the sap collecting device; and
a taphole located on the sidewall that is configured to engage a tap, the taphole being positioned generally below the notch defined by the sidewall, the taphole in communication with the open portion of the bottom end; and
a sap collecting bag removably connectable to the bottom end;
wherein the top end further defines a concave depression adjacent the notch, the concave depression configured to facilitate fingertip grip, wherein the notch defines an L-shaped configuration of the sap collecting device, wherein a first end of the L-shaped configuration terminates adjacent the concave depression of the sap collecting device and a second end of the L-shaped configuration terminates between the top end and bottom end to form an intermediate end.

15. The sap collecting kit of claim 14, wherein the sap collecting bag is attached to the sap collecting device with a bag fastener.

* * * * *